US005482138A

United States Patent [19]
Mori et al.

[11] Patent Number: 5,482,138
[45] Date of Patent: Jan. 9, 1996

[54] AUTOMATIC GREASING SYSTEM FOR CONSTRUCTION MACHINES AND ABNORMALITY DETECTING METHOD THEREFOR

[75] Inventors: Shigeki Mori; Yohjiro Ohbatake; Morio Tsuchie, all of Hirakata, Japan

[73] Assignee: Kabushiki Kaisha Komatsu Seisakusho, Tokyo, Japan

[21] Appl. No.: 232,296

[22] PCT Filed: Nov. 6, 1992

[86] PCT No.: PCT/JP92/01438

§ 371 Date: May 26, 1994

§ 102(e) Date: May 26, 1994

[87] PCT Pub. No.: WO93/09301

PCT Pub. Date: May 13, 1993

[30] Foreign Application Priority Data

Nov. 6, 1991 [JP] Japan .............................. 3-099353 U
Jan. 29, 1992 [JP] Japan .................................. 4-038525

[51] Int. Cl.$^6$ ................................................ F01M 1/18
[52] U.S. Cl. ........................ 184/6.4; 184/6.19; 184/7.2; 184/6
[58] Field of Search ............................ 184/6.1, 6.4, 6.19, 184/7.2, 7.3, 108, 6

[56] References Cited

U.S. PATENT DOCUMENTS 3,527,322  9/1970  Roberts ............................ 184/6.4
4,445,168  4/1984  Petryszyn ......................... 184/6.1
4,520,902  6/1985  Snow ................................ 184/7.4
4,674,030  6/1987  Gabriel et al. ................... 184/6.4
5,244,350  9/1993  Yang ................................. 184/6.4

FOREIGN PATENT DOCUMENTS 63-26447   7/1988  Japan .
1-190837   7/1989  Japan .
0279200   11/1989  Japan ................................... 184/7.3

Primary Examiner—Thomas E. Denion
Attorney, Agent, or Firm—Richards, Medlock & Andrews

[57] ABSTRACT

In greasing operation for pin-connected parts of a work machine, a swivel bearing, and the like of a construction machine, particularly a hydraulic excavating machine which has a number of parts which require greasing at a short greasing interval, automatic greasing is carried out when a total of added values of operation time of greased parts, such as the pin-connected parts of the work machine and the swivel bearing, or operation time and short non-operation time regarded as operation time reaches a specified greasing interval, and is stopped upon completion of greasing operation, so as to save operator's efforts in greasing work which requires a lot of man-hours and simultaneously prevent contamination of the periphery of the excavating machine with excessive grease overflowing from respective greased parts.

19 Claims, 9 Drawing Sheets

AUTOMATIC GREASING SYSTEM FOR CONSTRUCTION MACHINES AND ABNORMALITY DETECTING METHOD THEREFOR

BACKGROUND OF THE INVENTION

1. Field of the Invention

The present invention relates to an automatic greasing system and an abnormality detecting method therefor for a construction machine, such as a hydraulic excavating machine which is equipped with an earth working machine. The work machine is mounted on an upper swivel body of the excavating machine and comprises working members such as an arm member and an earth working tool, such as a bucket, which are articulation-connected to carry out earth moving work such as excavation by swinging these working members with hydraulic cylinders which are pin-connected between the arm member and the earth working tool.

2. Description of the Related Art

In general, those parts of construction machines, such as hydraulic excavating machines, for which greasing is required, that is, those pin-connected parts of earth working machines, such as an arm member and a bucket, are directly greased by an operator with a grease gun through the end faces of the pins or the bushes and bosses into which the pins are inserted. However, some construction machines are provided with a centralized greasing port for greasing several pin connections by supplying grease to these pin-connected parts. In the case of conventional greasing with the grease gun, the operator has to move about in order to reach the greased parts of the machine, since the greased parts are in dispersed locations. Therefore, it is troublesome for the operator to finish such greasing service. Since greasing is directly performed by the operator with the grease gun in this prior art method, the operator's clothing may become soiled with grease. In addition, as earth and sand are detrimental to machines, construction machines which handle earth and sand should be periodically greased at a greasing interval specified by the manufacturer. If the specified greasing interval is ignored, possible results include seizure of pins and bushes, production of loud sound or noisy rattling sound due to an increase of clearance between pins and bushes resulting from wear, and deterioration of durability due to development of wear caused by mud and sand which have entered into the pin-connected parts. Recently, an automatic greasing system for construction machines (Japanese Patent Application Laid-open No. 190837-1989), as shown in FIG. 12, has also been invented. In FIG. 12, a grease pump 38, connected to a pressure-accumulated grease tank 44, is provided on an upper swivel body 5 of a hydraulic excavating machine 1. A discharging port of the grease pump 38 is connected to a master distribution valve 52, and slave distribution valves 53 and 54 are connected in series to the downstream side of the master distribution valve 52. Each of the diverting ports of the master distribution valve 52 and the slave distributing valves 53 and 54 is connected by a greasing pipe to a respective one of the swivel bearing 3 of the swivel body 4, and the pin-connected parts 12–14, 18, 19, 21, 23, 25, 26, 30, and 31 for the work machine. On the other hand, a controller 20 is provided in an electric circuit which connects a battery 42 and a grease pump drive motor 43, which are located on the hydraulic excavating machine 1. The grease pump drive motor 43 can be operated by the controller 20 when an engine 50 has been operated for a predetermined cumulative time. In addition, when greasing from the master distribution valve 52 and slave distribution valves 53 and 54 to respective pin-connected parts 12–14, 18, 19, 21, 23, 25, 26, 30, and 31 is finished, the grease pump drive motor 43 can be stopped. After lapse of the above-described predetermined cumulative time, the operation of the grease pump 38 can be repeated.

The following describes the operation of the related art shown in FIG. 12. A key switch 48 is turned on and a manual switch 51 is set to the automatic greasing position in advance. When the engine 50 has been operated for the predetermined cumulative time according to a time function of the controller 20, the grease pump drive motor 43 starts operation by actuating the grease pump 38, and therefore grease 45 from the pressure-accumulated grease tank 44 is supplied by the grease pump 38 to the slave distribution valves 53 and 54 through the master distribution valve 52. At the same time, the grease 45 is distributed from the respective diverting ports of the master distribution valve 52 and the slave distribution valves 53 and 54 to the swivel bearing of the swivel body 4 and to the greasing ports of the pin-connected parts 12–14, 18, 19, 21, 23, 25, 26, 30, and 31 for the work machine 8. Therefore, all of the swivel bearing 3 and the pin-connected parts 12–14, 18, 19, 21, 23, 25, 26, 30, and 31 are automatically lubricated. The above greasing operation is finished when a limit switch 40, provided in the master distribution valve 52, operates to output its switch signal to the controller 20. The grease pump drive motor 43 is stopped according to a command of the controller 20, thereby simultaneously stopping the grease pump 38. Thus, while the grease pump 38 is in a stopped state, the engine 50 is started to make the hydraulic excavating machine 1 carry out the work. In this case, when the cumulative time of operation of the engine 50, as accumulated by a service meter 49 from the restarting of the engine 50, reaches the predetermined cumulative time, the operation process of the grease pump 38 as described above is repeated. If the hydraulic excavating machine 1 is not used for a long period of time, the greasing operation can be carried out as required by operating the manual switch 51. However, the automatic greasing system for the hydraulic excavating machine according to the related art is adapted to operate the grease pump drive motor 43 according to the timer function of the controller 20 to actuate the grease pump 38 when the engine 50 is operated for the predetermined cumulative time and to supply grease from the pressure-accumulated grease tank 44 through the grease pump 38 to the articulated connection parts 12–14, 18, 19, 21, 23, 25, 26, 30, and 31 of the work machine 8 through the master distribution valve 52 and the slave distribution valves 53 and 54. Accordingly, the time when the operator is away from the operator's seat and the engine is idling only for warming up, and the time when the engine is driven only for traveling, even though only the engine 50 is driven, are included in the cumulative operating time of the engine 50. Therefore, the grease pump drive motor 43 is operated according to the timer function of the controller 20 without regard to the operating time of the articulation-connected parts 12–14, 18, 19, 21, 23, 25, 26, 30, and 31 and of the swivel bearing 3 of the work machine 8. Thus, the grease from the pressure-accumulated grease tank 44 may be unnecessarily distributed to the articulation-connected parts 12–14, 18, 19, 21, 23, 25, 26, 30, and 31 and the swivel bearing 3 of the work machine 8 by the grease pump 38 through the master distribution valve 52 and the slave distribution valves 53 and 54. For this reason, the above-described automatic greasing system has been defective in an uneconomical use of grease, a contamination of the hydraulic excavating machine 1 and its ambiance due to overflows of excessive grease from the greased parts, and the like. Moreover, the greasing pipes for greasing the articulation-connected parts 23, 25, 26, and 30 of the work machine 8 can be damaged by earth and stones. In addition, when the above-described automatic greasing system is provided, an abnormality of this greasing system is displayed on a warning element of the monitor panel in the operator cabin. In this case, a signal is generated from the greasing system to the warning element of the monitor panel only when an abnormality occurs in the greasing system. In other words, according to the idea of the related art, when the system is normal, a low level (=0 V), at which no signal is generated to the warning element, is maintained between the controller 20 of the greasing system and the warning element. Only when an abnormality occurs in the system is the circuit therebetween changed over to a high level (for example, 24 V), and the abnormality warning produced. However, if it is adapted to generate a high level warning signal only when the system is abnormal as described above, the operator may continue the operation without being aware of an abnormality, and the work machine can be damaged due to seizure of the pins of the work machine when the warning signal is not generated to the warning element despite the fact that the system may not be capable of supplying grease to the greased parts, for example, when a fuse at the system side of the controller 20 is blown.

An object of the present invention made to eliminate the defects of the related art is to provide an automatic greasing system for construction machines capable of automatically supplying grease to the greased parts, and to provide an abnormality detecting method therefor capable of also detecting an abnormality of the controller 20 of the automatic greasing system. Moreover the present invention also provides an automatic greasing system for construction machines which is capable of eliminating such defects as an uneconomical use of grease, a contamination of the hydraulic excavating machine 1 and its ambiance due to overflow of excessive grease from the greased parts, and the like, since the articulation-connected parts 12–14, 18, 19, 21, 23, 25, 26, 30, and 31 and the swivel bearing 3 of the work machine 8 are greased despite the fact that the total operating time of the articulation-connected parts 12–14, 18, 19, 21, 23, 25, 26, 30, and 31 and the swivel bearing 3 of the work machine 8 has not reached the predetermined value.

SUMMARY OF THE INVENTION

A first aspect of the present invention is such that an automatic greasing system for a construction machine comprises: a grease pump for supplying grease to the greased parts of the construction machine through pipes, a drive source for actuating this grease pump, a greasing completion detector provided in a grease supplying route to detect completion of supplying grease to the parts to be lubricated, and a controller for controlling the drive source; wherein the controller comprises an accumulator for accumulating the operating time of the greased parts of the construction machine, a comparator for comparing the accumulated operating time with a predetermined value, and a drive signal generator for outputting a drive signal generation command to the drive source when the accumulated operating time exceeds a predetermined value; the accumulated time is reset and a drive signal stop command is outputted to the drive signal generator according to a detection signal of the greasing completion detector. Greasing is automatically carried out from the grease pump to the greased parts without the need of any operation by the operator, since the grease is supplied from the grease pump to the greased parts each time the accumulated operating time of the greased parts of the construction machine exceeds the predetermined time, and the grease pump is stopped to cease supplying grease when the greasing operation is completed. Therefore, such defects as uneconomical use of grease, contamination of the hydraulic excavator and its ambiance with excessive grease overflowing from the greased parts and the like can be eliminated.

A second aspect of the present invention is such that an automatic greasing system for a construction machine comprises: a grease pump for supplying grease to a plurality of greased parts of the construction machine through pipes, a plurality of distribution valves for distributing grease connected in parallel to the grease pump through a pipe to distribute grease from the grease pump to a plurality of the greased parts, a drive source for driving the grease pump, and a controller for outputting a drive signal to the drive source according to an accumulated time signal of the service meter of the engine of the construction machine when the accumulated time reaches a predetermined value; whereby grease can be supplied to a plurality of greased parts of the construction machine not only automatically but also through a plurality of distribution valves connected in parallel to the grease pump so that the greasing pressure to the greased parts can be made uniform and uniform greasing is possible for a plurality of greased parts. In contrast with the related art which specifies serial connection of the distribution valves, the number of greased parts which cannot be greased when one distribution valve fails is limited, and the repair is easy.

A third aspect of the present invention is such that a grease pump for supplying grease to a plurality of greased parts of a construction machine through greasing pipes, the discharging valve, and a protective device, which covers the outsides of the greasing pipes at least at an extreme end of the work machine of the construction machine, are provided on the work machine of the construction machine. Therefore, the greasing pipes can be protected from damage by earth and stones.

A fourth aspect of the present invention is such that, in an abnormality detection method for the automatic greasing system of a construction machine which detects an abnormality of the automatic greasing system by inputting to a warning component an output signal of the controller which controls the drive source for actuating the grease pump, the controller outputs a high-level signal while the system remains normal and a low-level signal when the system is abnormal. Accordingly, as the signal which is outputted by the controller to indicate a normal or abnormal condition of the system remains at a low level when the system is abnormal, the automatic greasing system can meet even such an abnormality as the controller not being able to generate a signal when a fuse is blown in the controller.

Thus, each of the first to fourth aspects of the present invention provides substantial labor saving in greasing work for the operator, since the grease pump drive motor is driven to start automatic greasing when the cumulative value of the operation time of the greased parts reaches a predetermined time, and the grease pump drive motor is stopped when automatic greasing is finished. Moreover, such defects as uneconomical use of grease, contamination of the hydraulic excavating machine and its ambiance with excessive grease discharged from the greased parts, and the like, can be eliminated. In addition, according to these aspects of the invention, grease can be uniformly supplied to a plurality of greased parts of the hydraulic excavating machine, and the greasing pipes provided at an extreme end part of the work machine of the construction machine can be protected against damage by earth and stones. Furthermore, the abnormality detection method according to the invention is able to detect even an abnormality of the controller itself, such as a blown fuse of the controller.

A fifth aspect of the present invention is such that an automatic greasing system for greasing a plurality of greased parts from a grease pump installed on the construction machine comprises: a controller for outputting start and stop command signals to a drive source for the grease pump, a drive operation detector for detecting that at least one of the plurality of greased parts is being driven, and a greasing completion detector, which is provided on a greasing pipe arranged between the grease pump and the plurality of greased parts; wherein the controller is adapted: to accumulate the drive operation time by inputting a detection signal from the drive operation detector, to start moving grease from the grease pump to the greased parts by outputting an operation command signal from the controller to the drive source of the grease pump when the accumulated drive operation time reaches a first predetermined value through repetition of accumulation of the drive operation time, and to stop passing grease from the grease pump to the greased parts by terminating the operation command signal from the controller to the drive source of the grease pump when the detection signal of the greasing completion detector is inputted, thus repeatedly controlling the starting and the stopping of the grease pump. Moreover, the controller is adapted to start passing grease from the grease pump to the greased parts by outputting the operation command signal from the controller to the drive source of the grease pump when the cumulative value of the drive operation time reaches a first predetermined value and to stop passing grease from the grease pump to the greased parts by terminating the operation signal from the controller to the drive source of the grease pump, whereby automatic greasing is carried out in response to the actual operation time of the greased parts by repeatedly controlling the starting and the stopping of the grease pump.

A sixth aspect of the present invention is such that the controller is adapted: to accumulate the drive operation time and simultaneously a continuous stop time of the detection signal by the drive operation detector while the detection signal of the drive operation detector is inputted, until the key switch of the engine installed on the construction machine is changed over to OFF after the controller changes over the key switch to ON, to start passing grease from the grease pump to the greased parts by outputting an operation command signal from the controller to the drive source of the grease pump when the total of the cumulative value of the continuous stop time, until the cumulative value of the continuous stop time reaches the second predetermined value, and the cumulative value of the drive operation time exceeds the third predetermined value, and to stop passing grease from the grease pump to the greased parts by terminating the operation command signal from the controller to the drive source of the grease pump, thus repeatedly controlling the starting and the stopping of the grease pump. Moreover, the controller is also adapted: to accumulate the drive operation time and simultaneously a continuous stop time of the detection signal by the drive operation detector while the detection signal of the drive operation detector is inputted, until the key switch of the engine is changed over to OFF after the controller changes over the key switch to ON, to start passing grease from the grease pump to the greased parts by outputting an operation command signal from the controller to the drive source of the grease pump when the total of the cumulative value of the continuous stop time, until the cumulative value of the continuous stop time reaches a second predetermined value, and the cumulative value of the drive operation time exceeds a third predetermined value, and to stop passing grease from the grease pump to the greased parts by terminating the operation command signal from the controller to the drive source of the grease pump, thus repeatedly controlling the starting and the stopping of the grease pump, and carrying out automatic greasing in response to the actual operation time of the greased parts.

A seventh aspect of the present invention is such that the controller is adapted to start accumulation of the drive operation time by inputting the detection signal of the drive operation detector after the controller changes over the key switch of the engine installed on the construction machine to ON, to continue the accumulation until the key switch is changed over to OFF, to start passing grease from the grease pump to the greased parts by outputting an operation command signal from the controller to the drive source of the grease pump when the total of accumulated drive operation time exceeds a fourth predetermined value through repetition of accumulation of the drive operation time, and to stop passing grease from the grease pump to the greased parts by terminating the operation command signal from the controller to the drive source of the grease pump when the detection signal of the greasing completion detector is inputted, thus repeatedly controlling the starting and the stopping of the grease pump. Moreover, the controller is also adapted to accumulate the drive operation time by inputting the detection signal of the drive operation detector until the key switch of the engine is changed over to OFF after the controller changes over the key switch to ON, to start passing grease from the grease pump to the greased parts by outputting an operation command signal from the controller to the drive source of the grease pump when the total of the cumulative value of drive operation time of the greased parts exceeds a fourth predetermined value, and to stop passing grease from the grease pump to the greased parts by terminating the operation command signal from the controller to the drive source of the grease pump, thus repeatedly controlling the starting and the stopping of the grease pump, and carrying out automatic greasing in response to the actual operation time of the greased parts.

An eighth aspect of the present invention is such that when the greasing operation of the automatic greasing system is completed, the greasing pipes and the grease tank are connected by actuating the changeover valve which is connected to the drive source of the grease pump, and the drive source of the grease pump reversely drives the grease pump to return the system to the reset condition, by removing the residual pressure in the greasing pipes, before the next greasing is started.

Thus according to the fifth to eighth aspects of the present invention, the grease pump drive motor is operated and automatic greasing is carried out when either the cumulative value of operation time of the greased parts of the work machine and the swivel bearing of the construction machine or the cumulative value of operation time and non-operation time which can be regarded as operation time reaches a predetermined time. The pump drive motor is stopped when the automatic greasing is completed. Therefore the operator can substantially save a lot of effort in greasing work, and such defects as an uneconomical use of grease, a contamination of the machine and its ambiance with excessive grease overflowing from the greased parts, and the like, can be prevented.

BEST MODES FOR CARRYING OUT THE INVENTION

Figure 1:
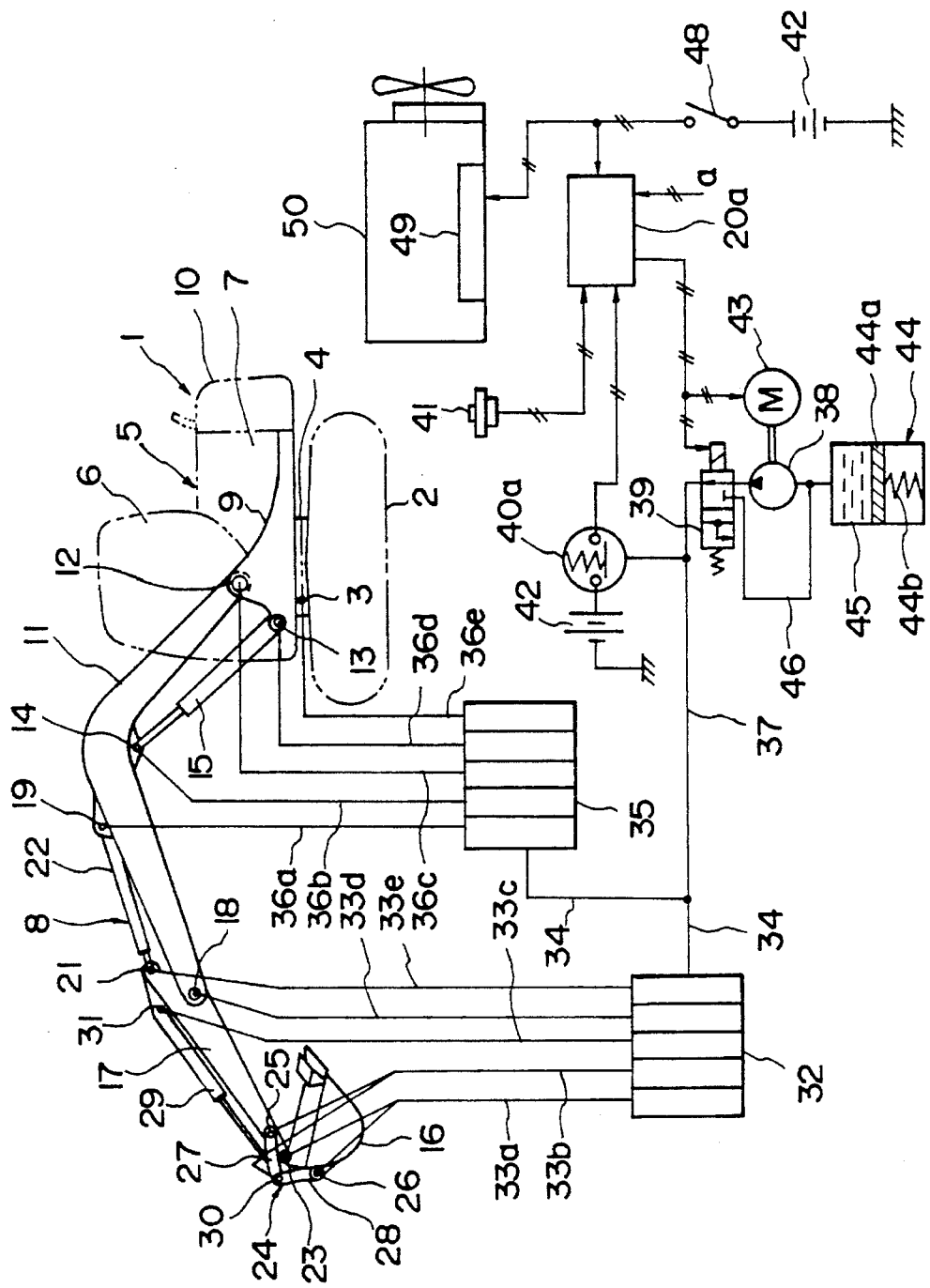
FIG. 1 is an overall configuration diagram of an embodiment common to all aspects of the present invention, also showing an embodiment specific to the second and eighth aspects of the invention.
Figure 2:
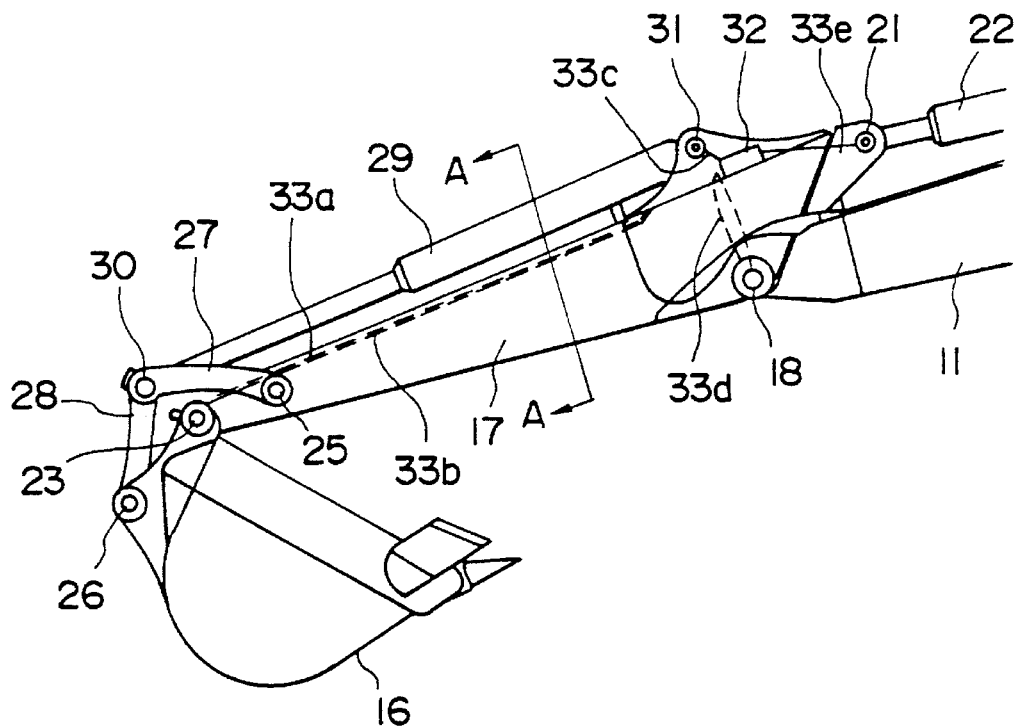
FIG. 2 is a diagram showing an embodiment of the third aspect of the invention, which shows an arrangement of the greasing pipes provided at an extreme end part of the work machine in the automatic greasing system for the construction machine shown in FIG. 1.
Figure 3:
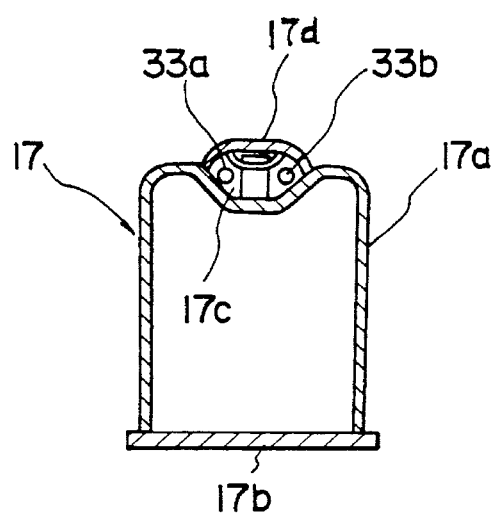
FIG. 3 is a diagram showing a principal part of the AA section in FIG. 2.
Figure 4:
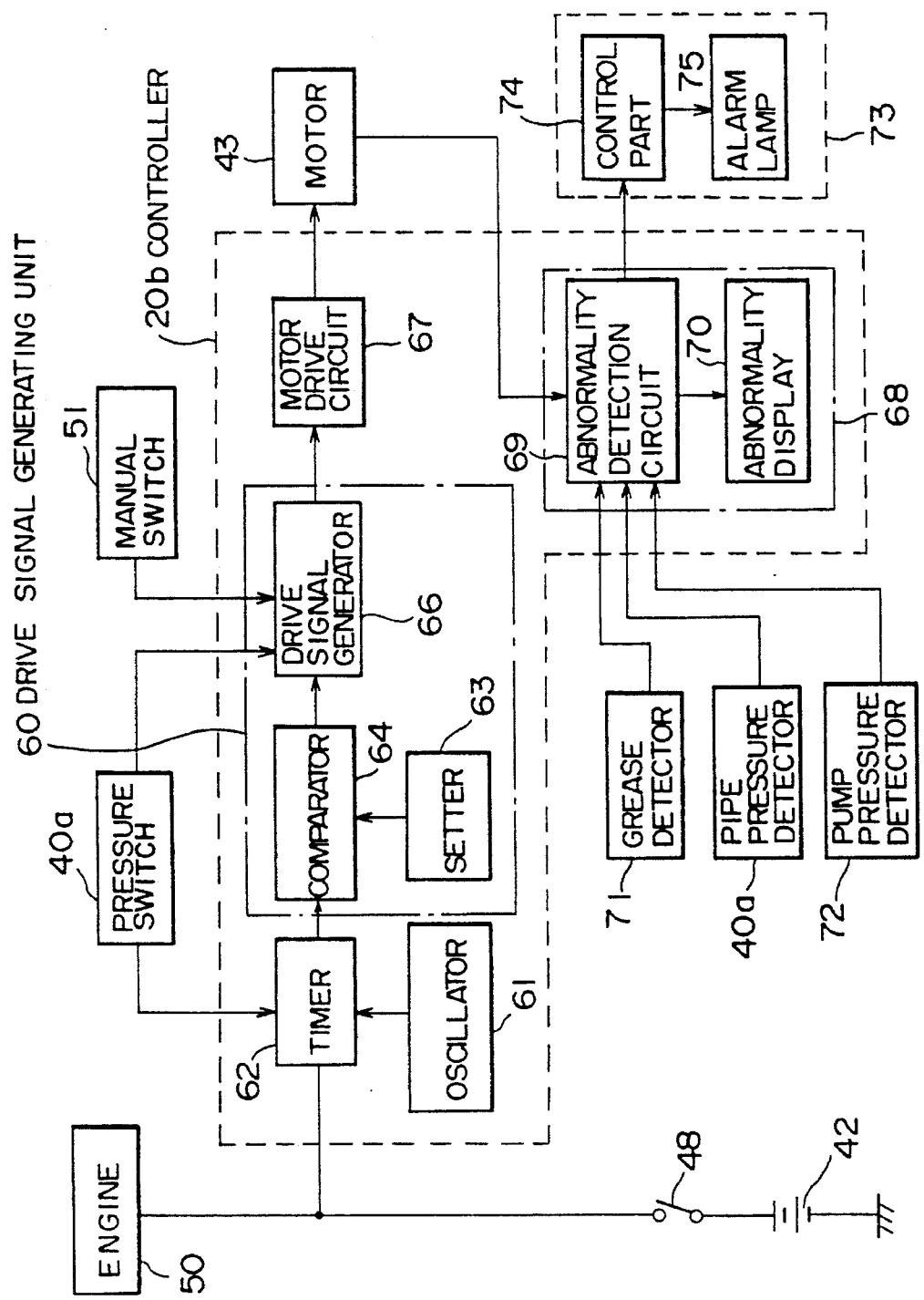
FIG. 4 is a detailed block diagram of the controller and related component units of FIG. 1, also showing an embodiment of the fourth aspect of the invention.

Preferred embodiments of an automatic greasing system and an abnormality detecting method for a construction machine according to the present invention are described in detail referring to the accompanying drawings. In FIG. 1, a hydraulic excavating machine 1, which is a construction machine, is equipped with an upper swivel body 5 which is provided with a slewing device 4 through a swivel bearing 3 on a lower crawler 2. The upper swivel body 5 has an operator cabin 6, in which a monitor panel and operation levers (neither is shown) are arranged, and a machine cab 7 installed behind the operator cabin 6. The upper swivel body 5 is provided with a revolving frame 9 which supports a work machine 8 and a counterweight 10 for balancing the work machine 8. An A-shapedboom 11 of the work machine 8 is pivotably mounted on the upper front part of the revolving frame 9 by boom foot pins 12. A boom cylinder 15, for vertically moving the boom 11, is pivoted between a lower coupling part 13 on the revolving frame 9 and a coupling part 14 provided at the bend in the boom 11. An arm 17, which supports a bucket 16 as an earth moving tool, is connected to the distal end of the boom 11 by boom top pins 18. In addition, an arm cylinder 22, for pivoting the arm 17 with the boom top pins 18 serving as the pivot, is provided between a coupling part 19, formed at the upper part of the boom 11, and a coupling part 21, provided at the upper rear end part of the arm 17. The bucket 16 is fitted to the distal end of the arm 17 by an arm top pin 23 so as to be pivotable with respect to the arm 17 with the arm top pin 23 as the center of rotation. The arm 17 is provided with a link mechanism 24 for pivotally operating the bucket 16. Specifically, coupling members 25 and 26 are provided behind the arm top pin 23 of the arm 17 and the rear end part of the bucket 16, respectively. The base ends of links 27 and 28 are respectively pivoted on the coupling members 25 and 26. The distal ends of these links 27 and 28 are pivoted to a coupling part 30, together with a rod of a bucket cylinder 29. A cylinder head part of the bucket cylinder 29 is pivotally mounted to a coupling part 31, which is formed at the rear end part of the arm 17. One end of each of greasing pipes 33a–33e is connected to a distribution valve 32, while the other end thereof is connected to a respective one of the coupling parts with boom top pins 18, the coupling parts with arm top pins 23, and the coupling members 21, 25, 26, 30, and 31. As shown in FIG. 2, the distribution valve 32 is positioned above the rear end of the arm 17. Greasing pipes 33a and 33b, which connect from the distribution valve 32 to arm top pins 23 and coupling members 25, 26, and 30, are housed in the arm 17. More specifically, as shown in FIG. 3, the arm 17 is formed to be hollow with an inverted U-shaped body member 17a and a plate member 17b. The body member 17a is formed by drawing and is provided with a storing recess 17c for storing the greasing pipes 33a and 33b. Greasing pipes 33a and 33b, which are stored in the storing recess 17c of the body member 17a are protected by a cover 17d fixed to the body member 17a. On the other hand, the distribution valve 32 is connected to a distribution valve 35 through a greasing pipe 34. Greasing pipes 36a–36e connect the distribution valve 35 to the coupling parts 12, 13, 14, and 19, which serve as greased parts, and to the swivel bearing 3. Greasing pipes 34 and 37 connect distribution valves 32 and 35 to a grease pump 38 through a changeover valve 39. The greasing pipe 37 is provided with a pressure switch 40a, serving as a greasing completion detector, which detects that supplying of grease to coupling parts 12, 13, 14, 19, 21, 25, 26, 30, and 31 has been completed. When the pressure of the grease in the greasing pipe 37 reaches a specified value, the pressure switch 40a connects a battery 42, mounted on the hydraulic excavating machine 1, to a controller 20a, which is described in detail in the following, and stops a motor 43 for driving the grease pump 38. The suction side of the grease pump 38 is connected to a grease tank 44, and grease 45 stored in the grease tank 44 is discharged into the greasing pipe 37 through the changeover valve 39. The grease tank 44 is provided with a piston 44a and a spring 44b which energizes this piston 44a to push out grease 45. The grease tank 44 is connected to the changeover valve 39 through a return pipe 46, so that grease 45 remaining in the greasing pipe 37 and the like can be returned to the grease tank 44. A key switch 48 is connected to the battery 42. The key switch 48 is connected to an engine 50 through a service meter 49 to carry out connection and disconnection of the engine 50 and the battery 42. The service meter 49 accumulates the operation time of the engine 50. The key switch 48 is connected to the controller 20 and, when a voltage of the battery 42 is applied to the controller 20 through the key switch 48, the service meter 49 accumulates a time during which the key switch 48 is kept closed. A manual switch 41 is connected to the controller 20, and the grease can be supplied to the greased parts 12, 13, 14, 19, 21, 25, 26, 30, and 31 by operating the manual switch 41 and driving the motor 43 at a desired timing. In FIG. 4, showing a fourth embodiment of the present invention, the controller 20a, shown in FIG. 1, has been replaced by a controller 20b which is adapted so that only the ON signal of the key switch 48 in FIG. 1 is inputted and the signal a is not entered. The controller 20b can be adapted so that only the signal a shown in FIG. 1 may be entered. In FIG. 4, timer 62 accumulates the time during which the key switch 48 is kept turned on, by counting the number of pulses outputted from an oscillator 61. A drive signal generating unit 60 receives the output of the timer 62 and outputs a drive signal to a motor drive circuit 67, which drives and stops the motor 43 according to the output signal of the drive signal generating unit 60. An abnormality displaying part 68 indicates when an abnormality has occurred in the automatic greasing system. The drive signal generating unit 60 comprises a comparator 64, into which a signal from the timer 62 is inputted; a setter 63, which outputs a reference value for comparison to the comparator 64; and a drive signal generator 66, which is connected to the output side of the comparator 64. This drive signal generator 66 and the timer 62 are connected to a pressure switch 40a, and are reset by an output signal of the pressure switch 40a. The drive signal generator 66 is connected to the manual switch 51 and outputs a motor drive signal to the motor drive circuit 67 when the manual switch 51 is operated. The abnormality displaying part 68 comprises an abnormality detecting circuit 69 and an abnormality display 70 comprising light emitting diodes (LED) and others. The abnormality detecting circuit 69 is connected to the motor 43, a grease detector 71 for detecting a quantity of grease in the grease tank 44, a distribution pipe pressure detector 40a for detecting a pressure in the greasing pipes, and a pump pressure detector 72 for detecting the discharging pressure of the grease pump 38, in order to detect such abnormalities of the system as disconnection of the motor 43, exhaustion of grease 45 in the grease tank 44, abnormal pressure in the greasing pipes, and abnormal pressure of the grease pump 38, and to output a display signal to the abnormality display 70. The abnormality detecting circuit 69 is connected to a monitor warning part 73 of the monitor panel provided in the operator cabin 6, and outputs a high level signal (for example, 24 V) to the monitor warning part 73 when the automatic greasing system is normal and a low level signal (0 V) when the system is abnormal. The monitor warning part 73 comprises, for example, a control part 74 and an alarm lamp 75. The control part 74 receives a signal from the abnormality detecting circuit 69 of the abnormality indicating part 68 to light up the alarm lamp 75 and inform the operator in the operator cabin 6 of the abnormality of the automatic greasing system. In the present embodiment arranged as described above, a greasing time interval according to which grease 45 should be supplied to the greased parts is set in advance in the setter 63 of the controller 20b. When the key switch 48 is closed and the timer 62 of the controller 20b is connected to the battery 42, the timer 62 starts counting the number of pulses outputted by the oscillator 61, accumulates the time during which the key switch 48 is closed, and outputs the accumulated time to the comparator 64 of the drive signal generating unit 60. The comparator 64 compares the accumulated time of the timer 62 with the preset time of the setter 63 and outputs the comparison result to the drive signal generator 66. When the comparison result, indicating that the accumulated time of the timer 62 is larger than the preset time of the setter 63, is outputted by the comparator 64, the drive signal generator 66 outputs a drive signal to the motor drive circuit 67 for controlling the motor 43, and a changeover signal to the changeover valve 39. With this, the changeover valve 39 is changed over to the position shown in FIG. 1, and the grease pump 38 is connected to the greasing pipe 37 through the changeover valve 39. Meantime, when a drive signal is outputted by the drive signal generator 66, the motor drive circuit 67 drives the motor 43 to actuate the grease pump 38. When the grease pump 38 is actuated, grease 45 in the grease tank 44 is discharged into the greasing pipe 37, supplied through the greasing pipe 34, distribution valve 35 and greasing pipes 36a –36e to coupling parts 19, 14 and 13, which are greased parts, to the swivel bearing 3, and to the coupling part which employs the boom foot pins 12, and simultaneously through the greasing pipe 34, distribution valve 32 and greasing pipes 33a–33e to the coupling parts which employ boom top pins 18 and arm top pins 23 as greased parts and to the coupling parts 21, 31, 25, 26 and 30. When grease 45 is supplied to all greased parts and the pressure of the greasing pipe 37 reaches a specified value, the pressure switch 40a, serving as the greasing completion detector operates to cause the voltage of the battery 42 to be inputted as a reset signal to the resetting terminal of the timer 62 of the controller 20b and as a drive stop signal to the drive signal generator 66 of the drive signal generating unit 60. Accordingly, the drive signal generator 66 outputs a changeover signal to change over the changeover valve 39. The drive signal generator 66 also outputs to the motor drive circuit 67 a signal for reversely rotating the motor 43 for a predetermined time. The reverse rotation of the motor 43 returns grease 45 remaining in the greasing pipes to the grease tank 44, thereby reducing the pressure in the greasing pipes to the initial condition. After this, when the timer 62 accumulates the closing time of the key switch 48 up to a time preset on the setter 63, the above greasing operation is repeated. In other words, automatic greasing for the greased parts is provided without manual operation by the operator after every specified driving time of the engine 50. When the manual switch 51 is operated, a signal is entered into the drive signal generator 66, which generates a drive signal for the motor 43 to similarly carry out automatic greasing as described above. On the other hand, the abnormality detecting circuit 69 of the abnormality warning part 68 monitors the condition of the motor 43 and the output signals of the detectors 71, 40a, and 72. When these indicate that the automatic greasing system is normal, the abnormality detecting circuit 69 does not enter a signal into the abnormality warning part 73 of the monitor panel. When a detection signal from a detector indicates that the grease tank 44 is empty, that the internal pressure of the greasing is abnormal, or that the motor 43 is disconnected due to wire breakage, the abnormality detecting circuit 69 outputs a display signal to the abnormality displaying part 68 to display that an abnormality has occurred, and a low level signal (0 V) to the control part 74 of the monitor warning part 73. When the control part 74 receives the low level signal from the controller 20b, the alarm lamp 75 is lit to indicate to the operator that an abnormality has occurred in the automatic greasing system. Thus, the present embodiment is adapted so that the closure time of the key switch 48 is accumulated, and automatic greasing is carried out after every specified driving time of the engine 50. Therefore, a periodical inspection, daily maintenance service, and manual greasing work with a grease gun are eliminated, and the operator can be free from stains and excessive physical efforts. Since the automatic greasing is certainly carried out after every specified driving time of the engine 50, the greasing interval can be longer than the specified time interval. This makes it possible to prevent seizure of pins and other elements, production of abnormal sound, and increase of wear, and to extend the service life of construction machines. Not only automatic greasing can be carried out at a desired timing by operating the manual switch 51, but also the automatic greasing interval can be set as required by varying the preset value on the setter 63. Instead of driving the motor 43 after every specified driving time of the engine 50, the motor 43 can be driven after every specified operation time of the greased parts as described in the first embodiment. Since the greasing pipes 33a and 33b for supplying grease to the greased parts at the distal end part of the arm 17 are built within the arm 17, the greasing pipes 33a and 33b can be protected from damage by earth and stones, the maintenance services of the system can be simplified, and the service life of the system can be extended. The arm 44 has the storing recess 17c for storing the greasing pipes 33a and 33b; and therefore the external dimensions of the arm 17 do not have to be increased. The abnormality detecting circuit 69 outputs to the monitor warning element 73 a high level signal when the system is normal and a low level signal when the system is abnormal. Therefore, even though an abnormality, such as a blown fuse occurs in the controller 20b of the automatic greasing system, the alarm lamp 75 of the monitor warning part 73 lights up to indicate to the operator that an abnormality has occurred in the system and that automatic greasing is impossible. In the second embodiment according to the present invention shown in FIG. 1, distribution valves 32 and 35 are connected in parallel to the greasing pipe 37, and therefore grease 45 can be supplied under an almost equal pressure to the greased parts to ensure uniform greasing. In the case of the related art, the greasing operation is entirely stopped when the master distribution valve 52 fails. In the case of the present embodiment, only part of the greased parts cannot be greased when either of distribution valves 32 and 35 fails; therefore, the effect of such failure can be reduced, and the repair is easy.

Figure 5:
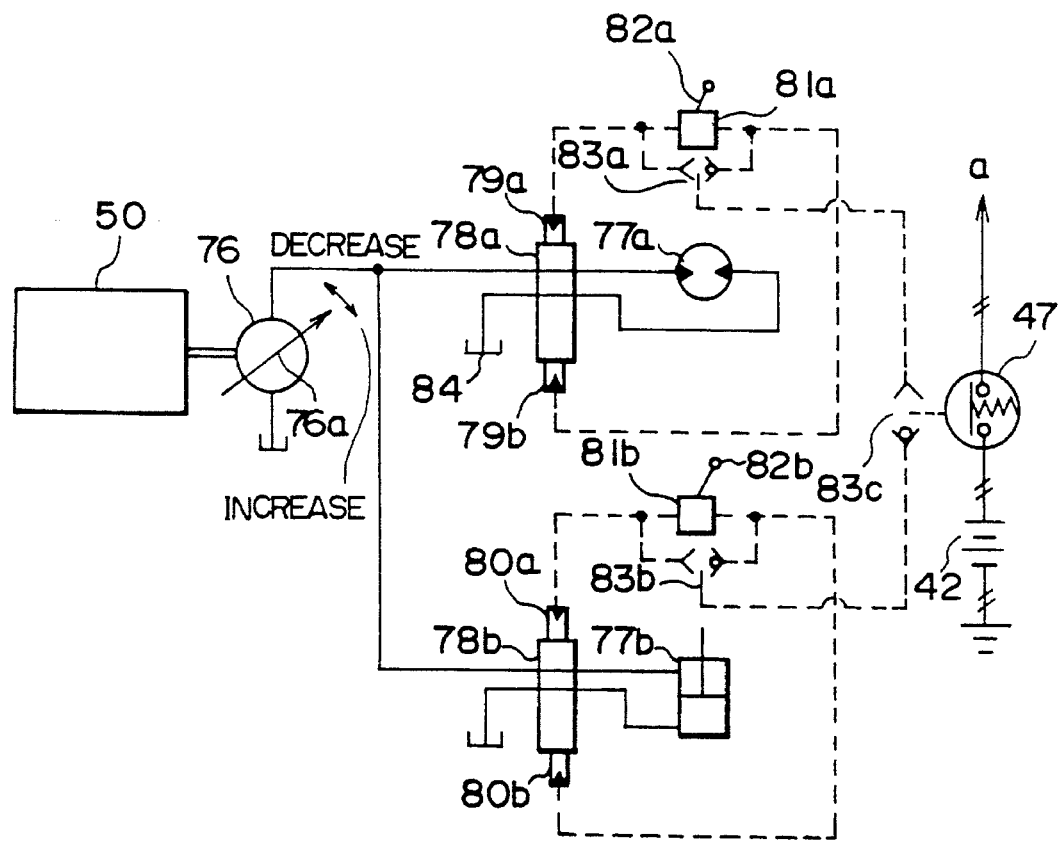
FIG. 5 is a diagram of the hydraulic drive circuit in the automatic greasing system of the construction machine of FIG. 1, also showing an embodiment of the first and fifth to seventh aspects of the invention.
Figure 6:
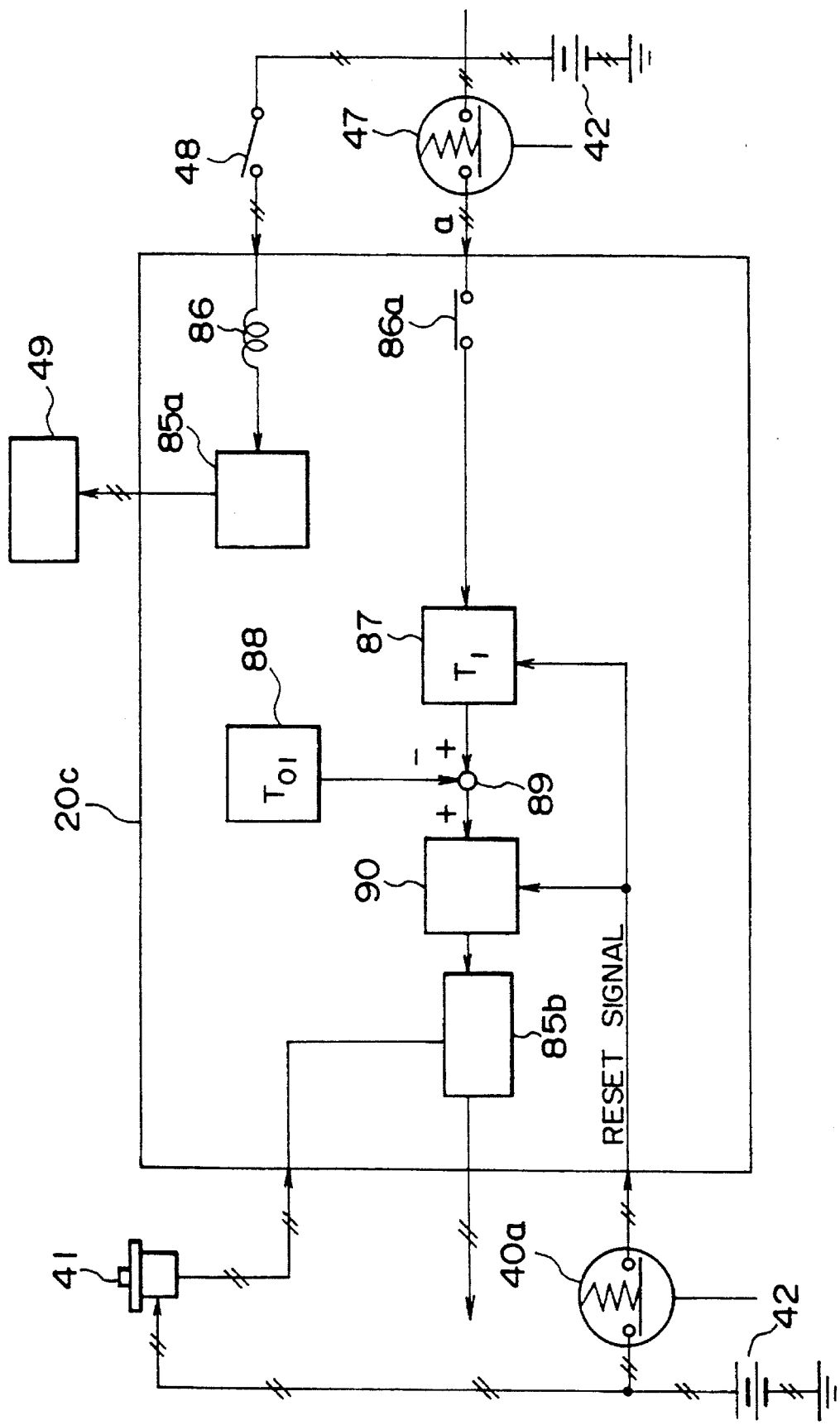
FIG. 6 is a detailed diagram of the controller showing an embodiment of the fifth aspect of the invention in the automatic greasing system of the construction machine shown in FIG. 1.
Figure 7:
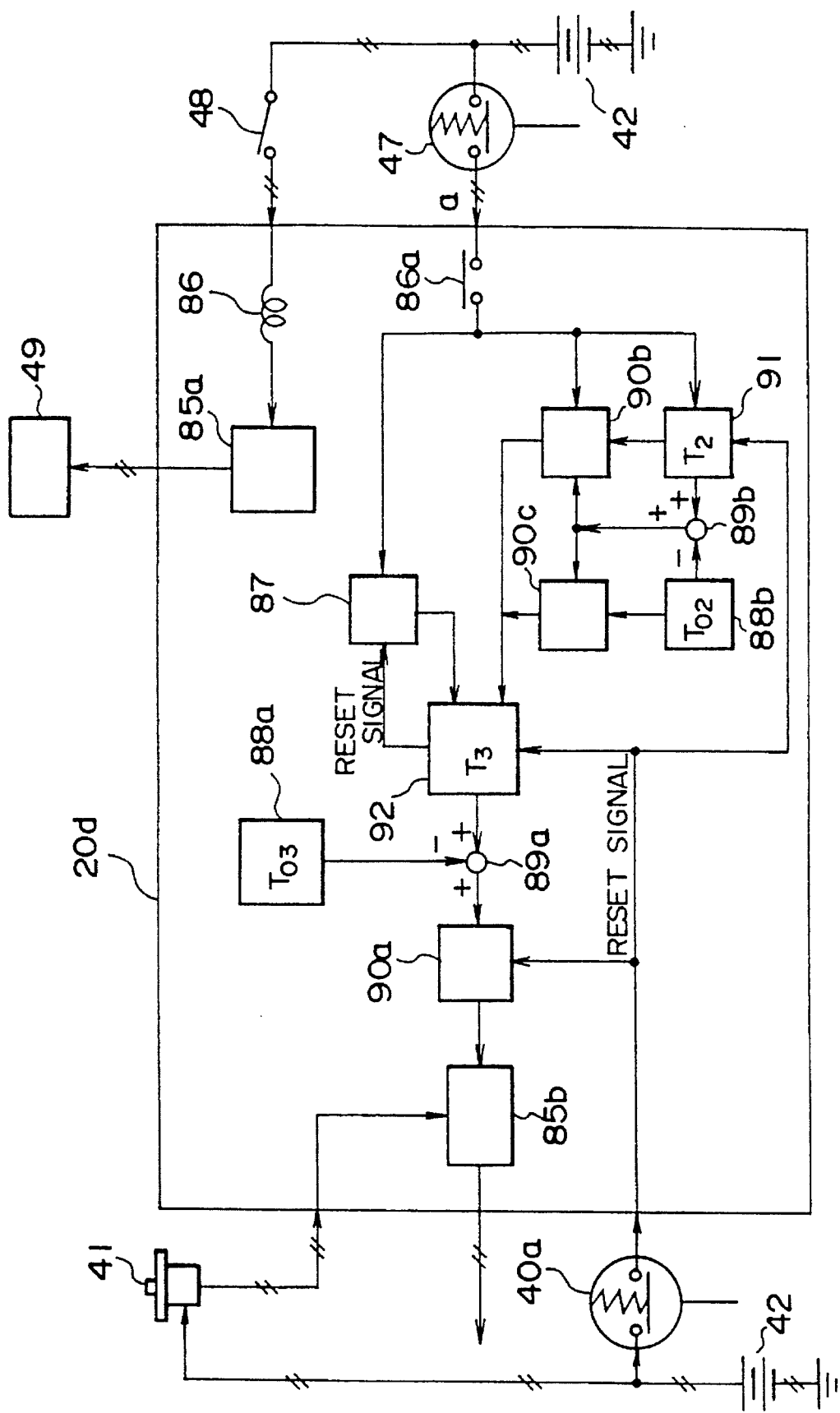
FIG. 7 is a detailed diagram of the controller showing an embodiment of the sixth aspect of the invention in the automatic greasing system of the construction machine shown in FIG. 1.
Figure 8:
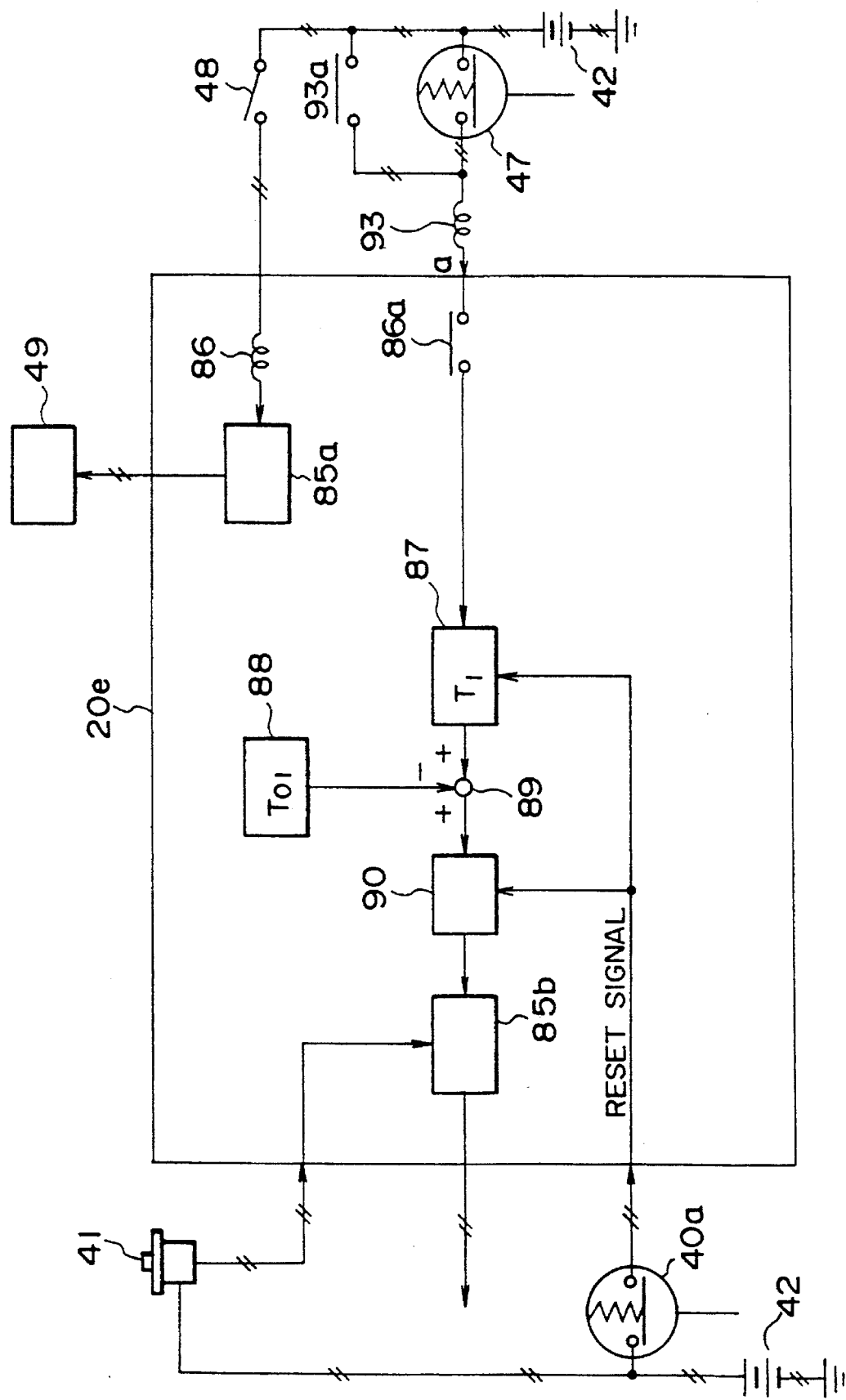
FIG. 8 is a detailed diagram of the controller showing an embodiment of the seventh aspect of the invention in the automatic greasing system of the construction machine shown in FIG. 1.

In FIG. 5, 76 denotes a variable capacity type hydraulic pump; 76a is a swash plate of the variable capacity type hydraulic pump; 77a is a slewing hydraulic motor; 77b is a boom cylinder (other arm cylinders are omitted); 78a is a slewing operation valve; 78b is a boom operation valve; 79a and 79b are pilot cylinders for driving the slewing operation valve 78a; 80a and 80b are pilot cylinders for driving the boom operation valve 78b; 81a is a slewing pilot valve for controlling the slewing operation valve 78a; 81b is a boom pilot valve for controlling the boom operation valve 78b; 82a is a slewing lever for controlling the slewing pilot valve 81a; 82b is a boom lever for operating the slewing pilot valve 81a; 83a is a shuttle valve for detecting a pilot pressure of the slewing pilot valve 81a; 83b is a shuttle valve for detecting a pilot pressure of the boom pilot valve 81b; 83c is a shuttle valve for detecting whichever of the pilot pressures of shuttle valves 83a and 83b is higher; and 84 is a tank. Since other reference numerals are as same as those in FIG. 1, the descriptions of the configuration and operation are omitted. FIGS. 6–8 respectively show details of embodiments of the controller of FIG. 5 in the automatic greasing system for construction machines according to the invention; and the components common to those shown in FIG. 1 are given the same reference numerals and the descriptions of the configuration and the operation are omitted.

In FIG. 6, 20c is a controller according to the fifth embodiment of the invention in place of the controller 20a shown in FIG. 1; 85a and 85b are amplifiers; 86 is a coil; 86a is a contact A which is operated by the coil 86; 87 is an accumulator of the drive operation time of the greased parts such as the swivel bearing 3 and the pin-connected parts 12–14, 18, 19, 21, 23, 25, 26, 30, and 31 of the work machine 4; 88 is a setter of an accumulated value obtained by the accumulator 87; 89 is a comparator for comparing the accumulated value of the accumulator 87 and the preset value of the setter 88; and 90 is a flip-flop circuit for outputting an operation start or stop command signal for the grease pump drive motor 43 to the amplifier 85b.

Figure 9:
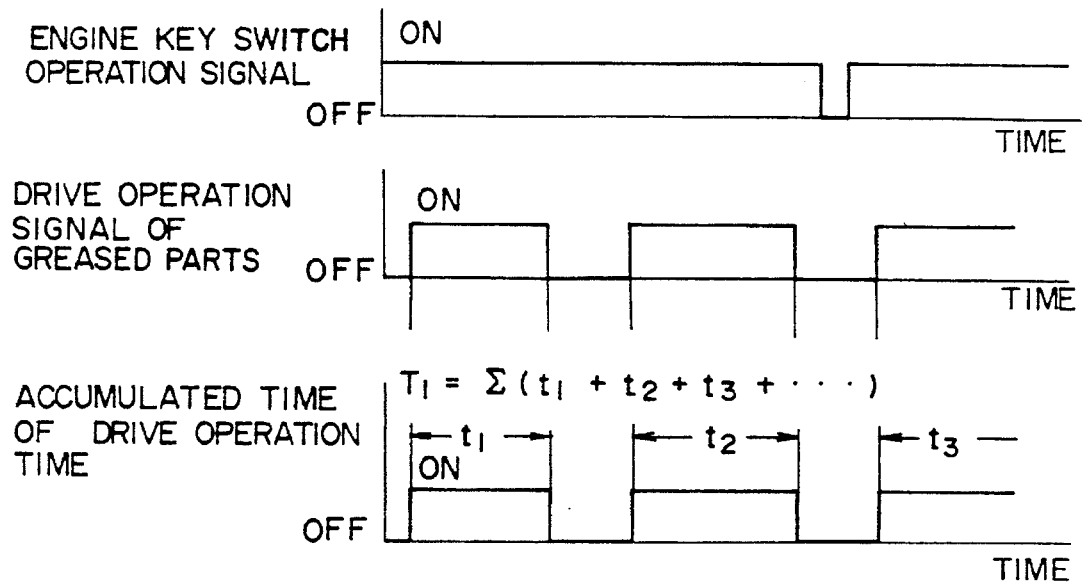
FIG. 9 is a diagram showing a time-elapsed change of the key switch operation signal of the engine, the drive operation signal of the greased parts, and the total $T_1$ of values ($t_1$, $t_2$, $t_3$ . . . ) of drive operation signals in the embodiment shown in FIG. 6.

The following describes the operation of the fifth embodiment according to the invention shown in FIG. 6, referring to FIGS. 1 and 5. When the key switch 48 of the engine 50 is set to ON, the power from the battery 42 is supplied to the service meter 49 through the coil 86 after having been amplified by the amplifier 85a, and accumulation of the service time is started. When the A contact 86a is closed by the exciting force of the coil 86 and at least one of the swivel bearing 3 and the pin-connected parts 12–14, 18, 19, 21, 23, 25, 26, 30, and 31 of the work machine 4 is operated by starting the operation of the hydraulic excavating machine, the pilot pressure is detected by the Accordingly, when a contact of the pressure switch 47 is closed by this pilot pressure, and the signal a, which actuates at least one of the swivel bearing 3 and the pin-connected parts of the work machine 4 of the hydraulic excavating machine, is inputted, the accumulator 87 starts accumulation of the drive operation time of the greased parts, such as the swivel bearing 3 and the pin-connected parts 12–14, 18, 19, 21, 23, 25, 26, 30, and 31 of the work machine 4. The value $T_1$ accumulated by the accumulator 87 and the preset value $T_{01}$ of the setter 88 are compared by the comparator 89 and, when the accumulated value $T_1$ of the accumulator 87 exceeds the preset value $T_{01}$ as much as specified ($T_1 > T_{01}$), a differential signal ($\alpha\ T_1 = T_1 - T_{01}$) of the comparator 89 acts on the flip-flop circuit 90, and the operation command signal for the grease pump drive motor 43 is outputted from the flip-flop circuit 90 to the amplifier 85b. This operation command signal is outputted to the grease pump drive motor 43 after having been amplified by the amplifier 85b. Therefore, the grease pump drive motor 43 is started and the grease is supplied from the grease pump 38 to the greased parts of the swivel bearing 3 and the pin-connected parts 12–14, 18, 19, 21, 23, 25, 26, 30, and 31 of the work machine 4 through the greasing pipe 37 and distribution valves 32 and 35. When the pressure in the greasing pipe 37 or the distribution valves 32 and 35 reaches the preset value of the pressure switch 40a, a reset signal is outputted to the accumulator 87 and to the flip-flop circuit 90, and the operation command signal which has been outputted to the grease pump drive motor 43 is stopped. Automatic greasing is carried out by repeating an operation similar to the above each time the total $T_1 = \Sigma(t_1 + t_2 + t_3 \ldots)$ of cumulative values ($t_1, t_2, t_3 \ldots$) of the drive operation time of the greased parts, such as the swivel bearing 3 and the pin-connected parts 12–14, 18, 19, 21, 23, 25, 26, 30, and 31 of the work machine 4, reaches the specified preset value $T_{01}$. FIG. 9 shows the time-elapsed changes of the key switch operation signal of the engine and the drive operation signals of the greased parts, and the total $T_1$ of cumulative values ($t_1$, $t_2$, $t_3$ . . . ) of the drive operation signals in the fifth embodiment. The operation command signal for the grease pump drive motor 43 is outputted from the flip-flop circuit 90 to the amplifier 85b when the accumulated value $T_1 = \Sigma(t_1+t_2+t_3 \ldots)$ of the drive operation time reaches the preset value $T_{01}$.

FIG. 7 shows the detailed view of the controller 20d in the sixth embodiment according to the invention in place of the controller 20a of FIG. 1. In FIG. 7, 85a and 85b are amplifiers; 86 is a coil; 86a is an A contact which is actuated by the coil 86; 87 is an accumulator for drive operation time of the greased parts, such as the swivel bearing 3 and the pin-connected parts 12–14, 18, 19, 21, 23, 25, 26, 30, and 31 of the work machine 4; 91 is an accumulator for continuous non-drive operation time of the greased parts; 88b is a setter for continuous non-drive operation time to be accumulated by the accumulator 91; 89b is a comparator for comparing the accumulated value of the accumulator 91 and the preset value $T_{02}$ of the setter 88b; 90b is a switching circuit which transmits an accumulated value signal of the accumulator 91 as long as the accumulated value of the accumulator 91 does not exceed the preset value $T_{02}$ of the setter 88b in the comparator 89b, and shuts off the accumulated value signal of the accumulator 91 when the accumulated value of the accumulator 91 exceeds the preset value $T_{02}$ of the setter 88b; 90c is a switching circuit which shuts off the preset value $T_{02}$ signal of the setter 88b as long as the accumulated value of the accumulator 91 does not exceed the preset value $T_{02}$ of the setter 88b in the comparator 89b, and transmits the preset value $T_{02}$ signal of the setter 88b when the accumulated value of the accumulator 91 exceeds the preset value $T_{02}$ Of the setter 88b; 92 is an adder which adds up the accumulated value signal of the accumulator 87 and the accumulated value signal from the switching circuit 90b or the preset value $T_{02}$ signal from the switching circuit 90c; 88a is a setter which provides a set value $T_{03}$ for the added value $T_3$ of the adder 92; 89a is a comparator for comparing the added value $T_3$ and the preset value $T_{03}$ of the setter 88a; and 90a is a flip-flop circuit which outputs an operation command signal for the grease pump drive motor 43 to the amplifier 85b according to the differential signal of the comparator 89a, and terminates the operation command signal for the grease pump drive motor 43 according to the reset signal from the pressure switch 40a. The above-described operation command signal is outputted to the grease pump drive motor 43 after having been amplified by the amplifier 85b and therefore the grease pump drive motor 43 is started and the grease is supplied from the grease pump 38 to the greased parts of the swivel bearing 3 and the pin-connected parts 12–14, 18, 19, 21, 23, 25, 26, 30, and 31 of the work machine 4 through the greasing pipe 37 and distribution valves 32 and 35. When the pressure of the greasing pipe 37 or the distribution valves 32 and 35 reaches the preset value of the pressure switch 40a, a reset signal is outputted to the accumulator 87 and the flip-flop circuit 90 and the operation command signal which has been outputted to the grease pump drive motor 43 is stopped. Automatic greasing is carried out by repeating again an operation similar to the above each time the total $T_3$ of added values ($t_1$, $t_2$, $t_3$ . . . ) including the accumulated value of continuous stop time reaches the specified preset value $T_{03}$, wherein the total includes the accumulated value of drive operation times of the greased parts, such as the swivel bearing 3 and the pin-connected parts 12–14, 18, 19, 21, 23, 25, 26, 30, and 31 of the work machine 4, and the accumulated value of continuous stop times which do not exceed the specified preset value ($T_{02}$).

Figure 10:
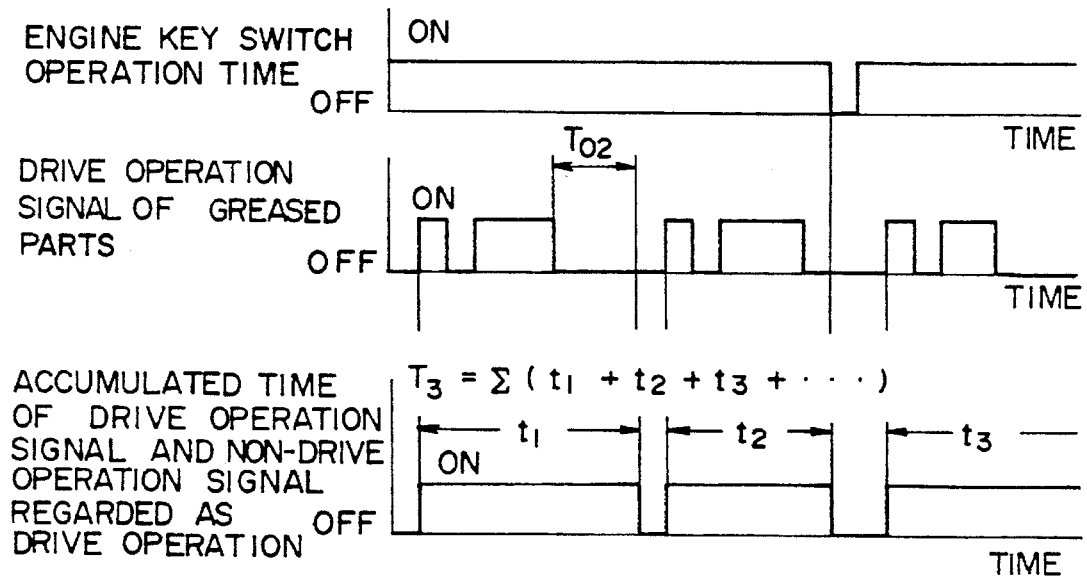
FIG. 10 is a diagram showing a time-elapsed change of the key switch operation signal of the engine, the drive operation signal of the greased parts, and the total $T_3$ of values ($t_1$, $t_2$, $t_3$ . . . ) of the drive operation signals and the non-drive operation signals of operations which are regarded as drive operation, in the embodiment shown in FIG. 7.
Figure 12:
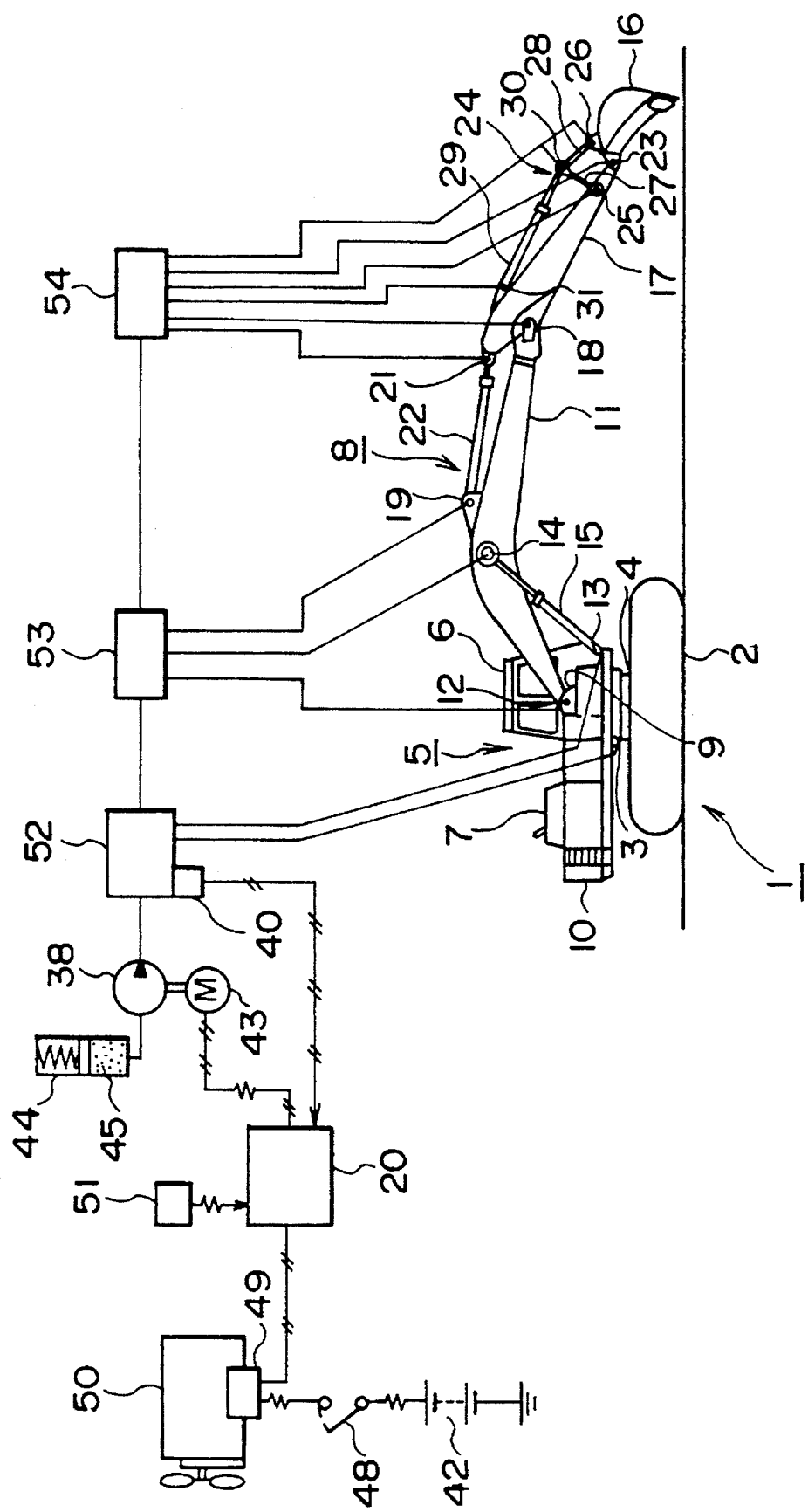
FIG. 12 is a diagram showing the related art.

FIG. 10 shows the time-elapsed changes of the key switch operation signal of the engine; the drive operation signals of the greased parts; and the total $T_3$ of added values ($t_1$, $t_2$, $t_3$ . . .) of the accumulated value of drive operation signals and the accumulated value of non-drive operation signals which are regarded as drive operation signals in the sixth embodiment. The operation command signal for the grease pump drive motor 43 is outputted from the switching circuit 90a to the amplifier 85b each time the added value $T_3 = \Sigma(t_1+t_2+t_3 \ldots)$ of the drive operation time reaches the preset value $T_{03}$.

FIG. 8 shows the detailed view of the controller 20e in the seventh embodiment according to the invention in place of the controller 20a in FIG. 1. In FIG. 8, 85a and 85b are amplifiers; 86 is a coil; 86a is an A contact which is actuated by the coil 86; 87 is an accumulator for drive operation time of the greased parts, such as the swivel bearing 3 and the pin-connected parts 12–14, 18, 19, 21, 23, 25, 26, 30, and 31 of the work machine 4; 88 is a setter for the accumulated value of the drive operation time; 93 is a coil; 93a is an A contact which is actuated by the coil 93; 89 is a comparator for comparing the accumulated value $T_1$ of the accumulator 87 and the preset value $T_{01}$ of the setter 88; and 90 is a flip-flop circuit which outputs an operation command signal for the grease pump drive motor 43 to the amplifier 85b according to the differential signal ($\Delta T_1 = T_1 - T_{01}$) of the comparator 89 when the accumulated value $T_1$ exceeds the preset value $T_{01}$ as much as specified ($T_1 > T_{01}$). The above-described operation command signal is outputted to the grease pump drive motor 43 after having been amplified by the amplifier 85b, and therefore the grease pump drive motor 43 is started and the grease is supplied from the grease pump 38 to the greased parts of the swivel bearing 3 and the pin-connected parts 12–14, 18, 19, 21, 23, 25, 26, 30, and 31 of the work machine 4 through the greasing pipe 37 and distribution valves 32 and 35. When the pressure of the greasing pipe 37 or the distribution valves 32 and 35 reaches the preset value of the pressure switch 40a, a reset signal is outputted to the accumulator 87 and to the flip-flop circuit 90, and the operation command signal which has been outputted to the grease pump drive motor 43 is stopped. When the drive operation for all greased parts of the swivel bearing 3 and the pin-connected parts 12–14, 18, 19, 21, 23, 25, 26, 30 of the work machine 4 is stopped during accumulation of the drive operation time in the accumulator 87, the pressure switch 40a is opened. However, a voltage of the battery 42 is continuously applied to the coil 93 through the A contact 93a, and the A contact 93a is kept closed. Therefore, the accumulator 87 continues accumulation until the key switch 48 is set to OFF.

Automatic greasing is carried out by repeating again an operation similar to the above each time the total $T_1$ of added values ($t_1$, $t_2$, $t_3$ . . . ) including the accumulated value of continuous stop time reaches the specified preset value $T_{01}$, wherein the total includes the accumulated value of drive operation times of the greased parts, such as the swivel bearing 3 and the pin-connected parts 12–14, 18, 19, 21, 23, 25, 26, 30, and 31 of the work machine 4 and the accumulated value of continuous stop times which do not exceed the specified preset value ($T_{02}$).

Figure 11:
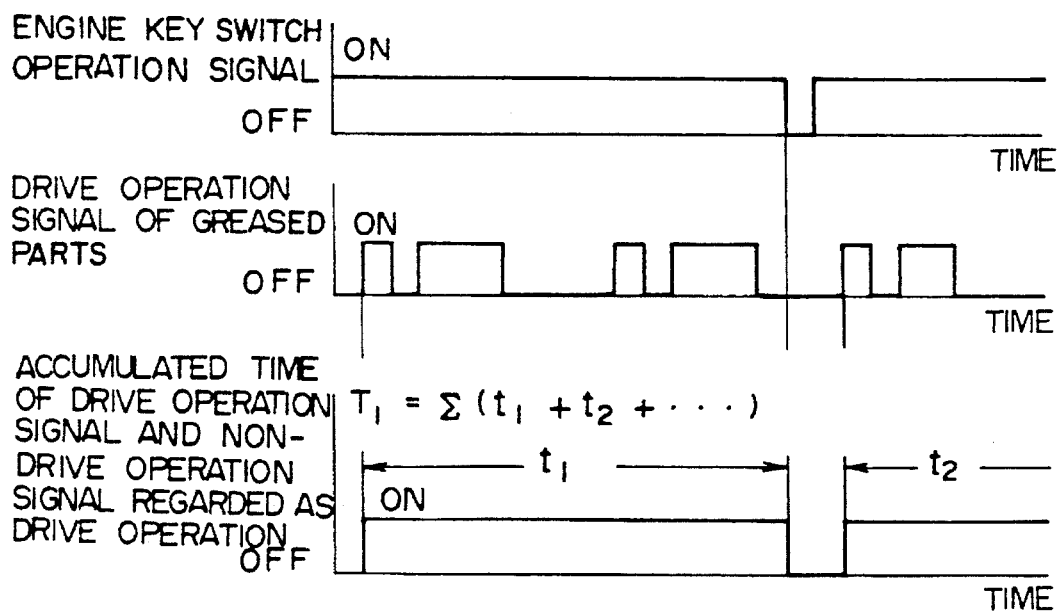
FIG. 11 is a diagram showing a time-elapsed change of the key switch operation signal of the engine, the drive operation signal of the greased parts, and the total $T_1$ of values ($t_1$, $t_2$, $t_3$ . . . ) of the drive operation signals and the non-drive operation signals of operations which are regarded as drive operation, in the embodiment shown in FIG. 8.

FIG. 11 shows the time-elapsed changes of the key switch operation signal of the engine, the drive operation signals of the greased parts, and the total $T_1$ of added values ($t_1$, $t_2$, $t_3$ ...) of the accumulated value of drive operation signals and the accumulated value of non-drive operation signals which are regarded as drive operation signals in the seventh embodiment. The operation command signal for the grease pump drive motor 43 is outputted from the flip-flop circuit 90 to the amplifier 85b each time the added value $T_1=\Sigma(t_1+t_2+t_3...)$ of the drive operation time reaches the preset value $T_{01}$.

INDUSTRIAL APPLICABILITY

The present invention is useful as an automatic greasing system and an abnormality detecting method for construction machines to enable to automatically supply an appropriate quantity of grease to articulation-connected parts of a work machine installed on an upper swivel body of, for example, a hydraulic excavating machine, while eliminating manual operation and preventing outflow of excessively supplied grease.

We claim:

1. An automatic greasing system for a machine having a plurality of greased parts, said system comprising:

a drive operation detector for detecting that at least one of said plurality of greased parts is being operated, and for establishing a drive detection signal in response thereto;

a grease pump;

a plurality of pipes for supplying grease from said grease pump to said plurality of greased parts of the machine;

a drive source for driving said grease pump;

a greasing operation completion detector for establishing a completion signal upon the completion of an operation of supplying grease from said grease pump to said plurality of greased parts; and a controller for controlling said drive source, wherein said controller comprises:
   (a) an operating time accumulator for accumulating the operating times of said greased parts of the machine,
   (b) a first comparator for comparing a signal, which is responsive to the thus accumulated operating time, with a first predetermined value, and for providing a comparison signal in response to results of the comparison, and
   (c) a drive signal generator for generating a drive signal generating command in response to the comparison signal, for outputting the drive signal generating command to said drive source to drive said grease pump when said accumulated operating time exceeds said first predetermined value, and for applying a drive signal stop command to said drive source to stop said grease pump in response to said completion signal; and
   wherein said operating time accumulator accumulates the drive detection signal as a representation of the accumulation of the operating times of said greased parts.

2. An automatic greasing system in accordance with claim 1, wherein the machine has an engine installed on the machine for operating said greased parts, and a key switch for actuating said engine; and wherein said controller further comprises:

a stop time accumulator to accumulate continuous stop times of the drive detection signal from the inputting of a drive detection signal until said key switch is changed over to OFF after said key switch has been set to ON;

a stop time comparator for comparing an accumulated stop time signal, which is responsive to the thus accumulated stop time, with a second predetermined value and for providing a comparison signal in response to results of the comparison;

at least one switching circuit, responsive to the comparison signal from said stop time comparator, for providing a non-drive operation signal representative of stop time operation which is regarded as drive operation, wherein said non-drive operation signal is representative of the lesser of said accumulated stop time signal and said second predetermined value; and an adder to total the accumulated operating time from said operating time accumulator and the non-drive operation signal and provide a total signal responsive thereto; and wherein said first comparator compares said total signal with said first predetermined value and provides a comparison signal in response to results of the comparison;

whereby said controller automatically starts the passing of grease from said grease pump to said plurality of greased parts by outputting an operation command signal to the drive source of the grease pump when a total, of (a) the lesser of an accumulated value of the continuous stop times and a second predetermined value, and (b) an accumulated value of said drive detection signal, exceeds said first predetermined value.

3. An automatic greasing system in accordance with claim 1, wherein the machine has an engine installed on the machine for operating said greased parts, and a key switch for actuating said engine; and wherein said operating time accumulator for accumulating the operating times of said greased parts of the machine accumulates drive operation time by inputting the drive detection signal of said drive operation detector from the time said key switch is changed from OFF to ON, and continues the accumulation of drive operation time until said key switch is changed from ON to OFF.

4. An automatic greasing system in accordance with claim 1, further comprising a grease tank, and a changeover valve interlocked with said drive source and having a first position connecting said grease pump and said plurality of pipes and a second position connecting said plurality of pipes and said grease tank; and wherein said controller is further adapted to operate said changeover valve to its second position upon an inputting of said completion signal, whereby grease in said plurality of pipes can pass to said grease tank.

5. An automatic greasing system in accordance with claim 4, wherein the second position of said changeover valve also provides a connection between said grease pump and said plurality of pipes; and wherein said controller is further adapted to operate said grease pump in reverse while said changeover valve is in its second position, to reduce the pressure of grease in said plurality of pipes, thereby returning the automatic greasing system to a reset condition before another automatic greasing operation is started.

6. An automatic greasing system in accordance with claim 4, wherein said controller is further adapted to operate said grease pump in reverse upon an inputting of said completion signal, to thereby reduce the pressure of grease in said plurality of pipes and return the automatic greasing system to a reset condition before another automatic greasing operation is started.

7. An automatic greasing system in accordance with claim 1, wherein said greasing operation completion detector for establishing a completion signal is a pressure detector mounted on one of said pipes to detect the pressure of grease in said one of said pipes.

8. An automatic greasing system in accordance with claim 1, wherein said machine is a construction machine having articulation-connected parts which constitute greased parts to be greased by the automatic greasing system.

9. An automatic greasing system in accordance with claim 1, further comprising a plurality of distribution valves connected in parallel between said grease pump and said plurality of pipes, whereby grease can be supplied from said grease pump through a respective one of the distribution valves to at least one of the greased parts of the machine.

10. An automatic greasing system in accordance with claim 1, wherein said machine has an engine for operating said greased parts, and wherein said accumulator for accumulating the operating times of said greased parts comprises a service meter associated with said engine.

11. An automatic greasing system in accordance with claim 1, further comprising a protective device for covering at least a portion of at least one of said plurality of pipes to protect said at least a portion of at least one of said plurality of pipes against damage.

12. An automatic greasing system for a machine having a plurality of greased parts, said system comprising:
 a grease pump;
 a plurality of pipes for supplying grease from said grease pump to said plurality of greased parts of the machine;
 a drive source for driving said grease pump;
 a greasing operation completion detector for establishing a completion signal upon the completion of an operation of supplying grease from said grease pump to said plurality of greased parts;
 an abnormality detection circuit and an abnormality warning element, said abnormality detection circuit being adapted to establish a condition signal representing the condition of the automatic greasing system and to input said condition signal to said abnormality warning element, said condition signal being a high level signal when the automatic greasing system is normal and being a low level signal when the automatic greasing system is abnormal; and
 a controller for controlling said drive source, wherein said controller comprises:
  (a) an operating time accumulator for accumulating the operating times of said greased parts of the machine,
  (b) a first comparator for comparing a signal, which is responsive to the thus accumulated operating time, with a first predetermined value and for providing a comparison signal in response to results of the comparison, and
  (c) a drive signal generator for generating a drive signal generating command in response to the comparison signal, for outputting the drive signal generating command to said drive source to drive said grease pump when said accumulated operating time exceeds said first predetermined value, and for applying a drive signal stop command to said drive source to stop said grease pump in response to said completion signal.

13. An automatic greasing system in accordance with claim 12, further comprising a grease supply connected to said grease pump, a sensor for establishing a first signal representative of the condition of said drive source, a sensor for establishing a second signal representative of the quantity of grease in said grease supply, a sensor for establishing a third signal representative of the pressure of grease in said pipes, and a sensor for establishing a fourth signal representative of the discharging pressure of the grease pump; wherein said abnormality detection circuit establishes said condition signal responsive to said first, second, third and fourth signals.

14. An automatic greasing system for a machine having a plurality of greased parts, said system comprising:
 a grease pump;
 a plurality of pipes for supplying grease from said grease pump to said plurality of greased parts of the machine;
 a drive source for driving said grease pump;
 a drive operation detector for detecting that at least one of said plurality of greased parts is being driven for operation, and for establishing a drive detection signal in response thereto;
 a greasing operation completion detector installed on one of said plurality of pipes for establishing a completion signal representative of a completion of an operation of supplying grease from said grease pump to said plurality of greased parts of the machine;
 a controller for outputting start and stop command signals to said drive source for driving said grease pump;
 wherein said controller is adapted to accumulate drive operation time by inputting said drive detection signal of said drive operation detector;
 wherein said controller is adapted to output an operation command signal to the drive source for driving said grease pump, to automatically start passing grease from said grease pump to said plurality of greased parts, when the thus accumulated value of said drive operation time reaches a first preset value; and
 wherein said controller is adapted to automatically stop the passing of grease from the grease pump to said plurality of greased parts, by terminating the outputting of said operation command signal to the drive source for driving said grease pump;
 thereby repeatedly controlling the starting and the stopping of the grease pump.

15. An automatic greasing system in accordance with claim 14, wherein the machine has an engine installed on the machine for operating said greased parts, and a key switch for actuating said engine; and wherein said controller is further adapted:
 to accumulate continuous stop times of the drive detection signal from the inputting of a drive detection signal until said key switch is changed over to OFF after said key switch has been set to ON;
 to start automatic greasing from said grease pump to respective greased parts by outputting an operation command signal from said controller to the drive source of the grease pump when a total of (a) the lesser of an accumulated value of the continuous stop times and a second preset value and (b) an accumulated value of said drive operation time exceeds said first preset value.

16. An automatic greasing system in accordance with claim 14, wherein the machine has an engine installed on the machine for operating said greased parts, and a key switch for actuating said engine; and wherein said controller is further adapted:
 to accumulate drive operation time by inputting the drive detection signal of said drive operation detector from the time said key switch is changed over to ON, and
 to then continue the accumulation of drive operation time until said key switch is changed from ON to OFF.

17. An automatic greasing system in accordance with claim 14, further comprising a grease tank, and a changeover valve interlocked with said drive source and having a first position connecting said grease pump and said plurality of pipes and a second position connecting said pipes and said grease tank; and wherein said controller is further adapted to operate said changeover valve to its second position upon an inputting of said completion signal, whereby grease in said plurality of pipes can pass to said grease tank upon the completion of an operation of supplying grease from said grease pump to said plurality of greased parts.

18. An automatic greasing system in accordance with claim 17, wherein the second position of said changeover valve also provides a connection between said grease pump and said plurality of pipes; and wherein said controller is further adapted to operate said grease pump in reverse while said changeover valve is in its second position, to thereby reduce the pressure of grease in said plurality of pipes, thus returning the automatic greasing system to a reset condition before another automatic greasing operation is started.

19. An automatic greasing system in accordance with claim 14, wherein said controller is further adapted to operate said grease pump in reverse upon an inputting of said completion signal, to thereby reduce the pressure of grease in said plurality of pipes and return the automatic greasing system to a reset condition before another automatic greasing operation is started.

* * * * *